US007108763B2

(12) United States Patent
Senzani

(10) Patent No.: US 7,108,763 B2
(45) Date of Patent: Sep. 19, 2006

(54) METHOD FOR MANUFACTURING MULTI-LAMINAR WOOD SHEETS WITH PRINTED PATTERNS

(76) Inventor: Giovanna Senzani, Viale Della, Repubblica 33, Modigliana (FC) (IT) 47015

( * ) Notice: Subject to any disclaimer, the term of this patent is extended or adjusted under 35 U.S.C. 154(b) by 321 days.

(21) Appl. No.: 10/188,063

(22) Filed: Jul. 3, 2002

(65) Prior Publication Data

US 2003/0012933 A1 Jan. 16, 2003

(30) Foreign Application Priority Data

Jul. 12, 2001 (IT) .......................... MI2001A1494

(51) Int. Cl.
*B32B 37/14* (2006.01)
*B44C 1/00* (2006.01)
*B44F 9/02* (2006.01)
*B27M 1/08* (2006.01)

(52) U.S. Cl. ...................... 156/264; 156/277; 156/384; 156/63; 427/280; 427/261; 427/397; 427/291; 427/421; 427/267; 144/350

(58) Field of Classification Search ................ 156/277, 156/384, 63, 264; 8/402; 427/280, 261, 427/397, 290, 291, 293, 421, 267; 144/350, 144/346
See application file for complete search history.

(56) References Cited

U.S. PATENT DOCUMENTS 4,089,644 A * 5/1978 Carbonell et al. ............. 8/400
4,279,519 A * 7/1981 Shiurila ................... 400/124.1
4,352,691 A * 10/1982 Owatari et al. .......... 106/31.46
4,388,133 A * 6/1983 Hirao et al. ................ 156/245
4,731,145 A 3/1988 Senzani
5,145,537 A 9/1992 Senzani
5,164,232 A * 11/1992 Henseleit et al. ........... 427/288
5,607,502 A * 3/1997 Hassenruck et al. ..... 106/31.51
5,778,789 A * 7/1998 Krishnan et al. ........ 101/450.1

FOREIGN PATENT DOCUMENTS

| | | |
|---|---|---|
| GB | 1288614 | 5/1969 |
| GB | 2 110 595 | 6/1983 |
| GB | 2 113 604 A | 8/1993 |
| JP | A 57-61566 | 4/1982 |
| JP | H2-116506 | 5/1990 |

* cited by examiner

*Primary Examiner*—Linda Gray
(74) *Attorney, Agent, or Firm*—Young & Thompson

(57) ABSTRACT

A method for manufacturing multi-laminar wood sheets by slicing from a flitch of natural and/or laminated wood sheets glued and pre-printed with a basic pattern. A basic pattern is printed on one or both faces of wood sheets obtained by rotary cutting or slicing a natural log or a multi-layered flitch; the printed sheets are subsequently used to form a final flitch from which multi-laminar wood sheets are then sliced having a pattern designed to simulate different types of natural or fancy woods. The basic pattern is printed while maintaining process conditions designed to control the penetration into the thickness of the wood sheet and surface diffusion of the colouring agent during printing step. The penetration and diffusion of the colouring agent is controlled by maintaining process parameters and conditions at an established value.

36 Claims, 8 Drawing Sheets

METHOD FOR MANUFACTURING MULTI-LAMINAR WOOD SHEETS WITH PRINTED PATTERNS

BACKGROUND OF THE INVENTION

The present invention refers to the manufacture of wood veneers, and in particular concerns a method for manufacturing multi-laminar wood sheets having a defined pattern, obtained by means of an innovative seemingly casual printing process, which is constantly reproducible in a controlled mode.

The present invention also refers to the multi-laminar wood sheets obtained by means of the method claimed herein, as well as to pre-printed basic wood sheets and to a flitch of wood comprising pre-printed wood sheets, forming an intermediate product.

STATE OF THE ART

As is known, the enormous demand for wood veneers has led to the development of a particular technology for manufacturing recomposed wood veneer, which makes use of inexpensive and low-quality woods and wood species still available to produce veneers which are imitative of various types of wood.

This technology has been developed over the years, with appreciable results; this technology has been widely described and illustrated in numerous prior documents, for example in GB 2.110.595, GB 1.288.614 and U.S. Pat. No. 4,731,145 which form integral part of the present description.

In particular, according to this known technology, a log of wood is continuously cut into a strip by means of a rotary cutting machine, while keeping the log rapidly rotating, and there cut to form sheets of natural wood having a substantially homogeneous structure, with the wood fibres oriented longitudinally to each sheet, parallelly arranged to the longitudinal axis of the log.

After removal of any defects and, if necessary, after a bleaching and re-colouring process in a dye bath, the natural wood sheets thus obtained are super-imposed and glued together to form a multi-layered flitch, which can be curved or shaped between suitable dies, from which it is subsequently possible to slice multi-laminar wood veneers.

Depending upon the methods used to compose the flitch, as well as the characteristics of the natural wood sheets used, or the adhesive material used to glue them, it is possible to obtain laminar wood sheets having different grains or different patterns by cutting.

In order to further improve this technology, in an attempt to produce multi-laminar wood veneers which more closely resemble the pattern of a briar veneer, U.S. Pat. No. 5,145,537 suggests the use of a colouring system by burning natural wood sheets in patches or spots in order to obtain casual shaped patterns, in which the burned area, of different colour, partially penetrates into the thickness of the wood.

Although this document also suggests the use of colouring by printing natural wood sheets, in practice the use of colouring by printing or by dyeing is simply mentioned as an alternative to the burning system, without however providing any useful teaching for an effective and controlled implementation of the process, which is designed to provide reproducibility and constancy of qualitatively appreciable results.

Conversely, the colouring by burning has proved to be wholly unsuitable, not only because of the risk of fire, but also due to the difficulty in repeatable and constantly controlling the penetration and diffusion of the burns into the thickness of the sheets.

A further document JP 2-116506 describes a method for manufacturing artificial wood sheets with decorative effects, according to which several coloured strips, of suitable thickness, are superimposed on natural wood sheets subsequently employed to form a flitch of wood from which multi-laminar wood sheets are then sliced having a defined pattern which depends upon the characteristics of the coloured strips disposed on each individual sheet composing the flitch.

The Japanese document also suggests forming inked bands, in place of the coloured strips, for example by simply pressing sheets of carbon paper onto one side of each wood sheet previously covered with a layer of adhesive.

This technology also presents considerable limits and drawbacks, in that it does not allow any diffusion of the colour into the thickness of the wood sheets, nor any control or substantial variation of the pattern on the end product, if not in a very limited way, allowing at the most to create simple geometric and perfectly regular diamond patterns, or simple stripes even if disguised by a seeming casualness.

For all these reasons, with the present multi-laminar wood technology it is virtually impossible to reproduce the grains of those wood species which in nature present a pattern defined by small patches or by coloured areolas, having random shapes and dispositions especially in the direction of the wood fibres, such as for example European lancewood, beech, Karelian Birch Burl, steamed beech, oak and others.

OBJECTS OF THE INVENTION

General object of the present invention is to provide a method for manufacturing multi-laminar wood sheets having patterns simulating grains of natural woods characterized by the presence of small coloured zones having defined and wholly random shapes, whereby it is also possible to obtain a good simulation and a constant reproducibility of the pattern, while maintaining the appearance of casualness of the simulated natural wood pattern.

A further object of the present invention is to provide a method for manufacturing multi-laminar wood sheets, whereby it is possible to create specific and wholly imaginary patterns, with unimaginable results not obtainable with conventional multi-layered wood technologies.

BRIEF DESCRIPTION OF THE INVENTION

In general, according to the invention, a particular innovative method has been provided for manufacturing multi-laminar wood sheets having patterns with defined shapes and dispositions, making use of a particular process for printing on natural wood or laminated wood sheets. After an extensive search, highly appreciable results have been obtained allowing to identify and define several basic parameters capable of controlling the penetration and diffusion of a suitable colouring agent into the thickness of each wood sheet; during the printing step, after having formed a flitch, multi-laminar wood sheets are cut according to a pre-established cutting plane so as to control the desired effect, also allowing to indefinitely reproduce a same result.

In particular, according to the present invention, a method is provided for manufacturing multi-laminar patterned wood sheets having patterns of defined shapes and dispositions on their side faces, in which said patterned wood sheets are cut from a multy-layered flitch of superimposed and glued base wood sheets, comprising the steps of:

a) printing a basic pattern on a side surface of the base wood sheets, by means of a printing solution comprising a colouring agent;

b) composing the flitch comprising said printed wood sheets;

c) slicing laminar wood sheets from said flitch; and comprising the additional step of:

c1) controlling the penetration and diffusion of the colouring agent into the base wood sheets during the printing of the same pattern, by maintaining process parameters at an established value, in particular the quantity of the colouring agent, the temperature and pH value of the printing solution during the pattern printing step.

Alternatively, at point a) the printing step can be carried out on sliced wood sheets obtained from multi-layered wood fitches, in place of, or in association with natural wood sheets.

The use of suitable printing aids, such as gelling, dispersing, equalizing, and wetting substances during the pattern printing step, allows to control or differentiate the degree of penetration and/or diffusion of the colouring agent.

For the purposes of the present description, the term colouring agent is understood to mean both colouring substances soluble in water, or in suitable solvents, and pigments maintained in suspension in water or other solvents.

Since the colouring agents are present in solutions at the dissolved state, while pigments in suspension contain particles which, even though small, are always enormously greater in size than those of the molecules of a dissolved colouring agent, the pigments present a more limited capability to penetrate into the wood, thereby achieving different results, in the two cases.

For this reason, with pigments it will be possible to obtain printed patterns which penetrate to a limited degree into a surface layer of the wood sheet, while with colouring agents, it will be possible to obtain a much more penetrating print of the pattern. In this connection, it should be pointed out that colouring agents can be divided into different dyeing classes, by chemical affinity or by dyeing chemisum; even though in general, any type of colouring agent can be used, in practice good results have been obtained using certain classes of colouring agents, such as for example, colouring agents belonging to the acid class, the direct class, the basic class and the reactive class, with different results in each case, as far as penetration into the thickness of the wood sheet and surface definition of the pattern are concerned.

This different behavior of the colouring agents and pigments can be advantageously used to obtain new and different results with the printing procedure according to the present invention.

The step of forming the wood flitch from which the multi-laminar sheets are subsequently cut, may vary from time to time depending upon specific requirements and the required end product; for example, the flitch may be formed using natural wood sheets printed with a same basic pattern, or by mixing, according to a pre-established scheme, natural wood sheets with a first basic pattern, with natural wood sheets with a second or a third basic pattern, as well as with natural wood sheets simply dyed, having the same ground colour as the wood sheets to be produced, or a different colour and/or colours.

It is also possible, after composing and slicing a first flitch, to make use of the multi-laminar wood sheets thus obtained to re-compose a second flitch, in combination with wood sheets printed with the same or with another pattern and/or wood sheets simply dyed, to obtain a different end product; there are numerous possible variations for printing the patterns and composing the fitches.

As previously mentioned, there are numerous process variables which allow to control the penetration and diffusion of the colouring agent in the wood sheets, during the printing step. For example, during the numerous tests carried out, it was verified that varying several chemical/physical parameters of the printing process, can radically change the degree of penetration and diffusion of the colouring agent in the wood.

One relevant parameter which must be constantly controlled during the printing step of the pattern on the surface of the natural wood sheet, is the temperature of the printing solution, that is the temperature of the water or of the solvent and in general the colouring agent dissolved therein and pH value.

Another parameter to be controlled of the quantity of colouring agent lay down on the wood sheet during the printing step, which can vary in relation to the type of wood to be printed, the characteristics of the colouring agent, the chemical/physical state of the same colouring solution used for the printing process, the temperature of the same solution, the moisture content of the wood sheets, as well as the use of particular printing aids, as previously mentioned.

The basic pattern can be printed on the wood sheets by any suitable system, for example by means of a roller or by means of the silk-screen process, depending upon the specific requirements or the characteristics of the pattern to be reproduced.

Since the chemistry of the colouring agent, in particular that of soluble colouring substances, is strongly influenced by the pH value of the solvent, it has been noted that anionic dyes with an alkaline pH typically possess a normally greater capability to penetrate into the wood than those in an acid environment, and vice-versa for cationic dyes.

The chemistry of the colouring agent used can consequently constitute a further parameter for controlling the degree of diffusion and penetration of the colouring agent into the wood.

As previously mentioned, in certain cases it may also be advisable to consider the degree of hydration of the wood sheets to be subjected to the printing process; in fact, excessively dehydrated wood would require more time to allow for the penetration and diffusion of the colouring agent, while an excessively moist wood on the contrary would cause an excessive uncontrolled diffusion of the colour, causing the fading of the outlines of the printed pattern.

The presence, or lack of presence, of certain auxiliary substances, for example a surface-active agent, may serve to modify the molecular diffusion of the dye into the wood fibres; the use of a surface-active agent to increase the diffusion of the dye may be useful in those cases where the spreading of the colour with partial loss of sharpness of the figuration is not a particular problem.

In certain cases, in addition to controlling the temperature and pH parameters of the printing solution and the dosing of the latter, it has also been found useful to control the chemical/physical moisture parameters of the wood, together with the choice of a suitable colouring agent.

It has been found by various tests, that for example, in order to obtain satisfactory penetration of the colouring agent into the wood, it may be advisable to maintain the moisture content of the wood comprised between 10 and 30% during the printing process, making use of an acid class colouring solution, with a neutral, or slightly alkaline pH, at a temperature comprised between 50° C. and 90° C.

To obtain a less penetrating effect, good results have been obtained by operating with a moisture content comprised between 5 and 10%, with pigments, in a neutral environment, at a temperature comprised between 30° C. and 50° C., or with direct class dyes with acid pH at a temperature comprised between 50° C. and 60° C.

It is obvious however that the choice and controlling modes of the various process parameters must be established each time on the basis of several preliminary tests, taking into account the object and teachings of the present invention.

BRIEF DESCRIPTION OF THE DRAWINGS

These and further features of the method according to the invention, as well as several applicative example, will be further described hereunder with reference to the accompanying drawings, in which.

DETAILED DESCRIPTION OF THE INVENTION

Figure 1:
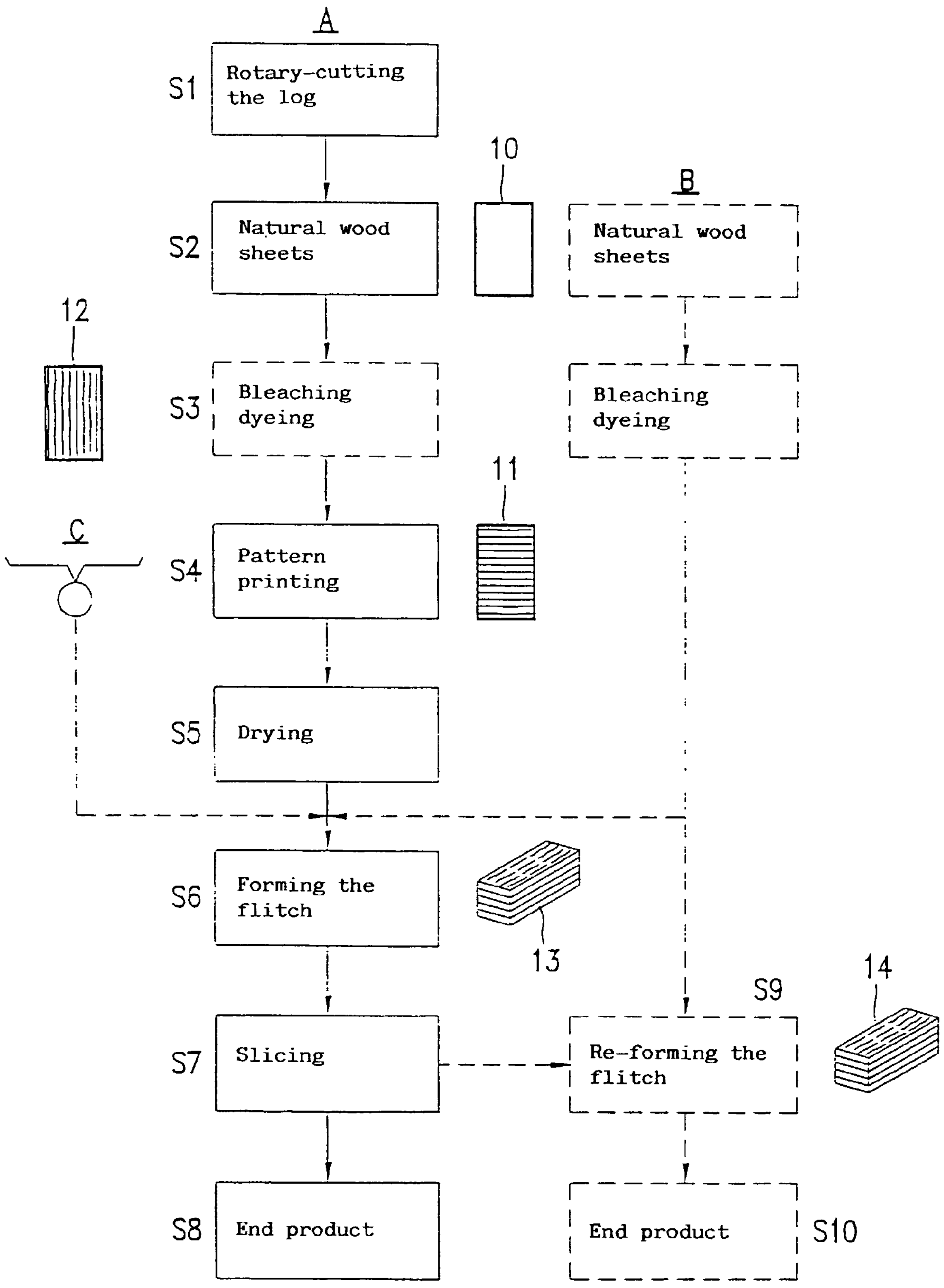
FIG. 1 shows a flow chart illustrating the principal steps of the method according to the invention.

As shown in FIG. 1, the method according to the invention comprises a series of steps S1–S8 which are carried out in succession along a processing line A; as shown, it comprises a step S1 of rotary-cutting a log into sheets, which is followed by a step S2 of cutting and preparing natural wood sheets 10 having a homogeneous structure with the wood fibres oriented in a longitudinal direction.

Depending upon the type of wood used, the operations of cutting and preparing the natural wood sheets are normally followed by a step S3 of bleaching and subsequent dyeing the wood sheets 10 to prepare them for a printing step S4 for printing them with a repetitive basic pattern, for example with a transversal striped pattern as schematically shown by reference 11 in FIG. 1.

Once the operation of printing the basic pattern on the natural wood sheets has been completed, they are sent on to a subsequent drying step S5 carried out by means of a suitable oven, and then sent on to the subsequent step S6 for forming a flitch of wood 13, obtained by superimposing flat wise and gluing together a certain number of printed sheets 10, if necessary mixed with a certain number of non-printed sheets, as explained further on, and pressing the flitch 13 of sheets by means of a suitable shaped die in a proper press.

After having formed a flitch 13, and after the glue has been left to harden, the flitch 13 can be sent on to the slicing step S7 which can be carried out in different ways with different angles of the cutting planes, depending upon the specific requirements, and then on to step S8 of the final product.

The composition of the flitch 13 can be carried out in any desired way, by superimposing printed wood sheets 11 having a same basic pattern, preferably alternating printed wood sheets 11 with natural wood sheets 10, supplied for example by a processing line C always comprising a step S2 of preparing the wood sheets and a bleaching and dyeing step S3. It is also possible to combine the first printed sheets 11, with non-printed natural wood sheets 10, as well as with second printed sheets 12, for example having a pattern comprising longitudinal stripes, fed by a process line C as schematically shown in FIG. 1, as well as with multi-laminar sheets.

FIG. 1 also shows the possibility of a supplementary step S9 of re-composing a second flitch 14 obtained by mixing and superimposing for example, non-printed natural wood sheets 10, with multi-laminar wood sheets sliced from a previous flitch 13, to obtain an end product S10 having pattern characteristics different from the previous end product S8.

It is obvious therefore that the composing modes of the flitch can also vary compared to those described solely by way of example to illustrate several possible alternatives.

According to the present invention, in order to attain the desired results, during the step S4 of printing the basic pattern, it is advisable to maintain constant control over several process parameters to ensure the correct penetration and diffusion of the colouring agent, both superficially and into the thickness of the natural wood sheet.

Figure 2:
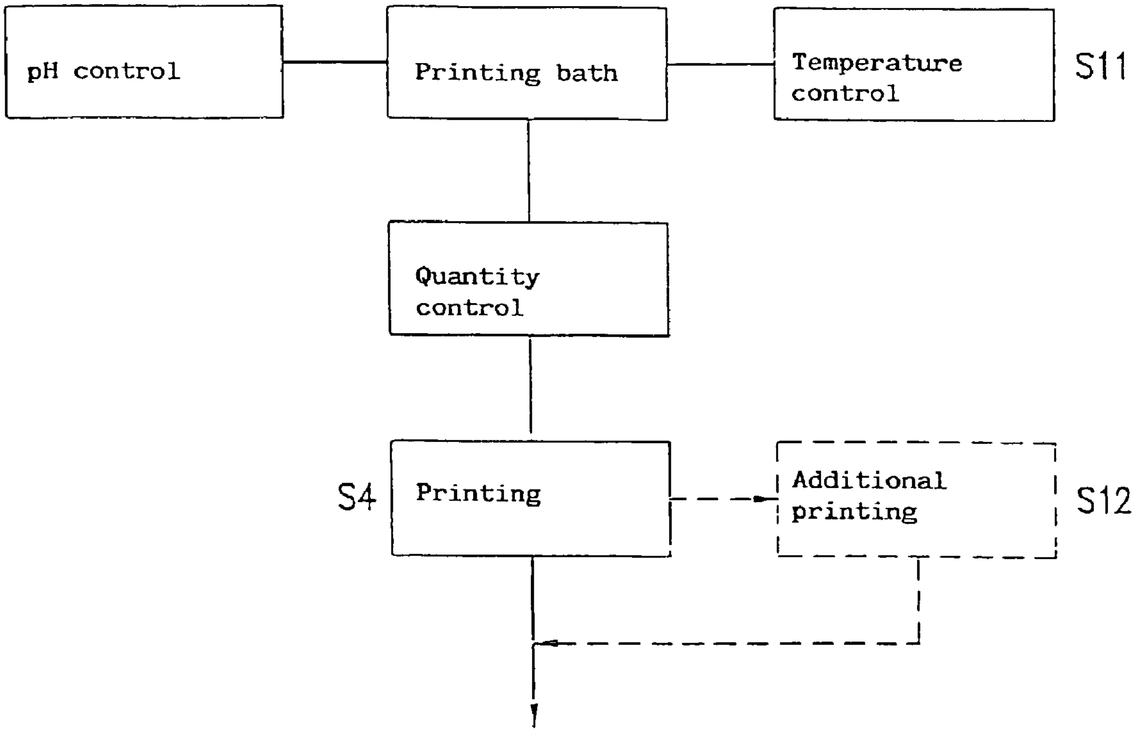
FIG. 2 shows a secondary flow chart of the principal controls carried out during the step of printing the patterns.
Figure 3:
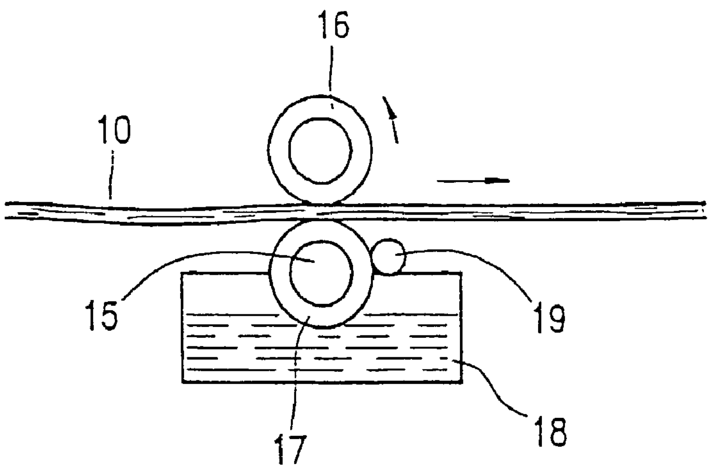
FIG. 3 shows a schematic view of a roller printing system which can be used for printing a basic pattern on natural wood sheets, according to the invention.

As shown for example in the diagram in FIG. 2 referring to the printing step S4 in FIG. 1, whenever use is made of a roller printing system, schematically shown in FIG. 3, the natural wood sheets 10 are made to pass through two rubber-coated rollers 15 and 16 at least one of which, for example the printing roller 15, is coated with a suitable layer of rubber 17 having a suitable printing mark or pattern, for example consisting of a succession of stripes, which is continuously soaked in a printing bath 18.

After the wetting or soaking of the printing roller 15 with the printing bath 18 is carried out a step of controlling the dosing or quantity of colouring agent which must be laid down by the roller 15 on one side face of the natural wood sheet 10, as shown in FIG. 3.

The dosing control can be made in any appropriate way, for example by controlling the soaking degree of the printing roller 15 by means of a squeeze roller 19, or by also controlling the feed speed of the sheet 10 through the two printing rollers 15 and 16.

Contemporaneously to the dosing control of colouring agent deposited on the sheet 10 during the printing step, it is also necessary to control the temperature of the printing bath 18, as indicated by S11, so as to maintain the bath temperature at a substantially constant value, which depends both upon the characteristics of the wood sheet 10 to be printed and upon the chemical-physical characteristics of the printing agent used.

The temperature of the bath 18 can be controlled in any appropriate way, for example by detecting the temperature with a thermal probe, which in turn controls a resistance immersed in the bath 18 to maintain it at the required temperature.

The printing step S4 for printing on each natural wood sheet, or part thereof, can be carried out in a single operation, or in successive operations, by providing one or more additional printing steps as schematically indicated with S12 in FIG. 2.

The choice of pattern, printing system and number of printing operations to be carried out on a same natural wood sheet 10 will depend upon specific requirements, that is to say upon the end product to be obtained. In addition, the printing operation or operations can be carried out using always a same printing agent, of the same colour, or of a different colour from the first, or again using printing agents having different chemical-physical characteristics.

Figure 4:
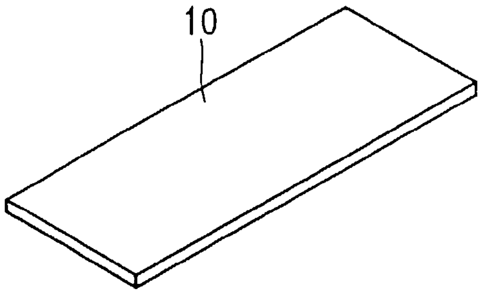
FIG. 4 shows a perspective view of a natural wood sheet, prior to the printing step.

FIGS. 5 to 9 show, by way of example, different types of basic patterns printed on a natural wood sheet 10, shown in FIG. 4, without this being understood in the limitative sense.

Figure 5:
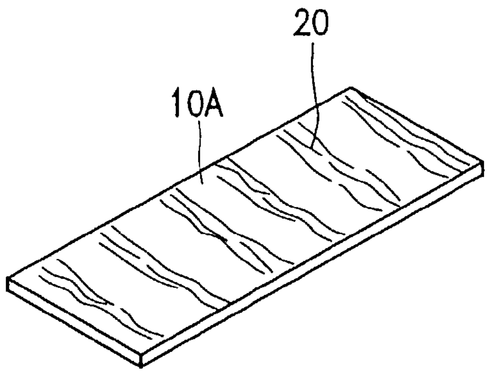
FIG. 5 shows a perspective view of a natural wood sheet, printed with a pattern composed of a series of transversal bands.

In particular, FIG. 5 shows a natural wood sheet 10A printed on one face with a basic pattern consisting of a plurality of transversal bands and/or stripes 20, obtained for example by the roller printing system shown in FIG. 3.

The printed bands or stripes 20 can be of any type; for example, they can be bands of even or variable widths, or rectilinear, wavy or irregular stripes, of the same or different thickness, placed at constant or variable distances between each stripe or band of stripes and those adjacent thereto.

Likewise, the bands or stripes 20 can be printed with a same colour, or with one or more superimpositions of the same colour or with different colours, in any case providing the whole composition of the printed pattern with defined shapes and forms.

Figure 6:
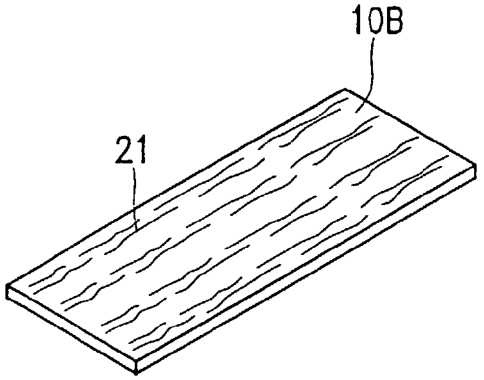
FIG. 6 shows a perspective view of a natural wood sheet, printed with a pattern composed of a series of longitudinal bands.

FIG. 6 of the accompanying drawings shows, in the same way as the example of FIG. 5, a longitudinal disposition of printed bands or stripes 21 on a natural wood sheet 10B, in which the bands or stripes of pattern 21 extend substantially in the longitudinal direction of the fibres of the natural wood. All the pattern printing variations previously described can be applied also in this case.

Figure 7:
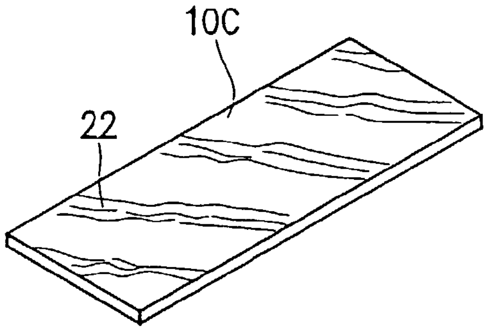
FIG. 7 shows a perspective view of a natural wood sheet, printed with a pattern composed of a series of diagonal bands.

FIG. 7 of the accompanying drawings shows instead a natural wood sheet 10C on which has been printed bands or stripes of pattern 22, disposed in an oblique direction in relation to the direction of the wood fibres; all the pattern printing variations previously illustrated can be applied also in this case.

Figure 8:
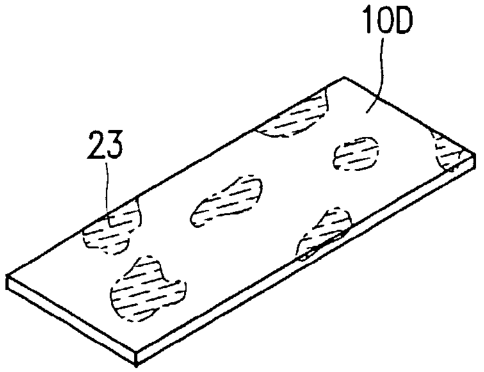
FIG. 8 shows a perspective view of a natural wood sheet, printed with a spotted pattern.
Figure 9:
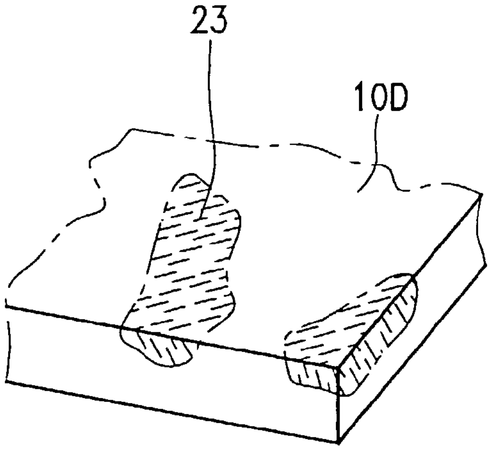
FIG. 9 shows an enlarged detail of FIG. 8.

Lastly, FIGS. 8 and 9 show a fourth case in which a natural wood sheet 10D has been printed with a pattern consisting of a plurality of patches 23 of seemingly irregular shapes and sizes, disposed with apparent casualness.

In particular, the enlarged view of FIG. 9 shows the controlled degree of penetration of the colouring agent into the thickness of the wood sheet, as well as the surface diffusion of the colour for each patch 23 of the pattern, which presents a sharp outline without smudges.

Returning now to FIG. 10, this shows the forming of a flitch 13 by means of a plurality of natural wood sheets 10A dyed with transversal bands, mixed with a plurality of natural wood sheets (10) dyed, and not printed, in conformity with the previously described method.

Figure 10:
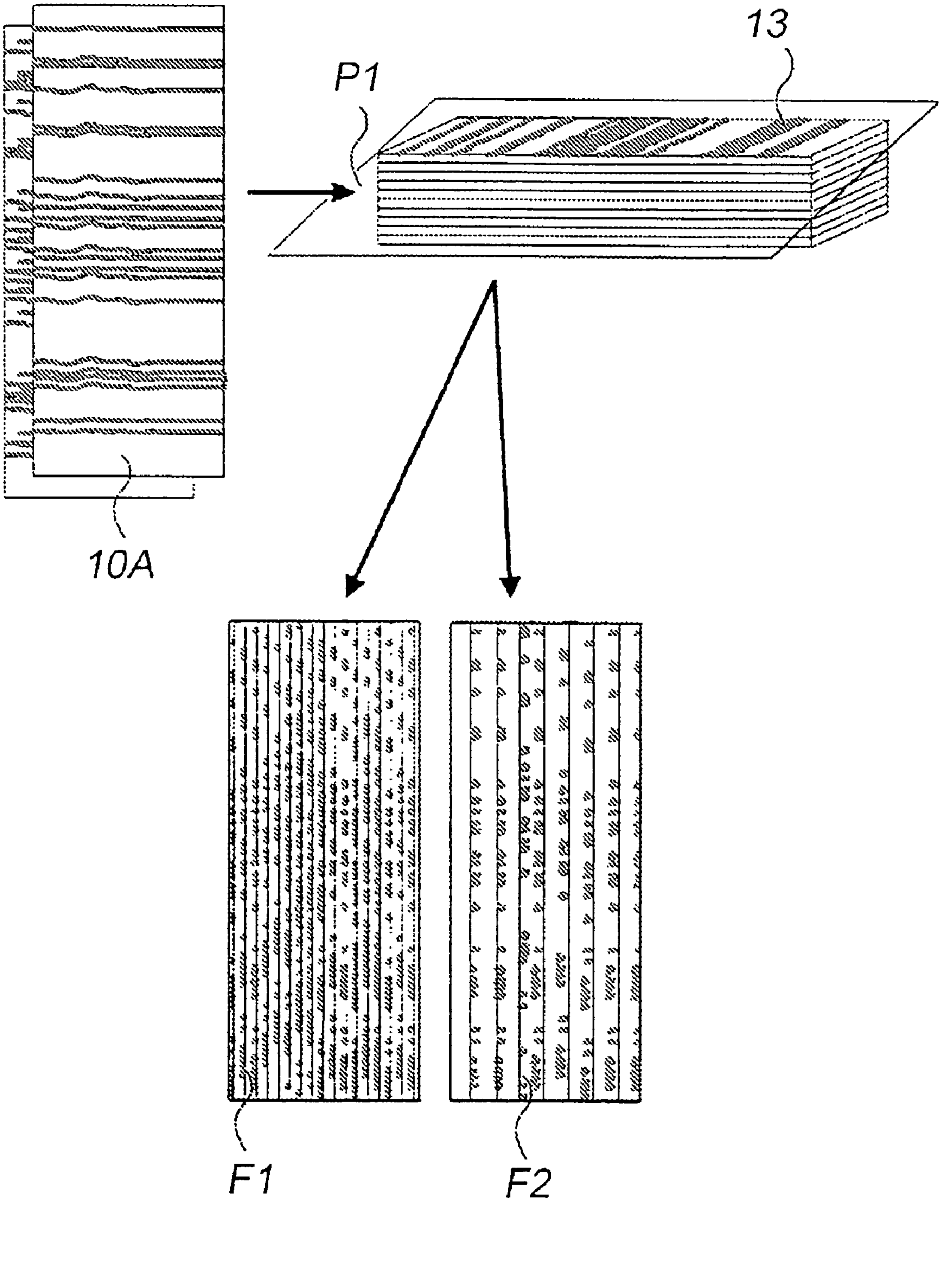
FIG. 10 shows a diagram illustrating the steps of forming and slicing a flitch of wood, according to the invention.

In particular, FIG. 10 shows how it is also possible, starting from a same formation of the flitch 13, to vary the pattern features of the end product F1 or F2 by simply varying the slant of the cutting plane P1.

In fact, starting from a basic pattern consisting of continuous and/or discontinuous transversal bands or stripes, it is possible to obtain distinct patches of colour on the end product F1, oriented in the longitudinal direction of the sheets corresponding to the direction of the wood fibres.

From what has been disclosed it will be clear that it is possible to obtain patterns with more or less large or more or less long patches or stripes in the longitudinal direction of the multi-laminar sheets F1 or F2 by varying the width of the printed bands or stripes 20, or to obtain patterns with more or less thick patches or stripes by varying the penetration of the colouring agent into the thickness of the natural wood sheets, during the printing step, or by varying the slant of the cutting plane.

In this way it is possible to simulate more or less densely grained woods, but marked by coloured patches in the direction of the grain.

Moreover, since it is also possible to carry out several printing operations on one or both sides of a same natural wood sheet, with the same basic pattern or with different basic patterns, or with the same colour or with different colours, using the same type of wood as the natural sheet 10, it is possible to obtain more or less dense markings, of different toning down or even contrasting colours, to obtain multi-laminar wood sheets with wood grains or with purely imaginary patterns.

Figure 11:
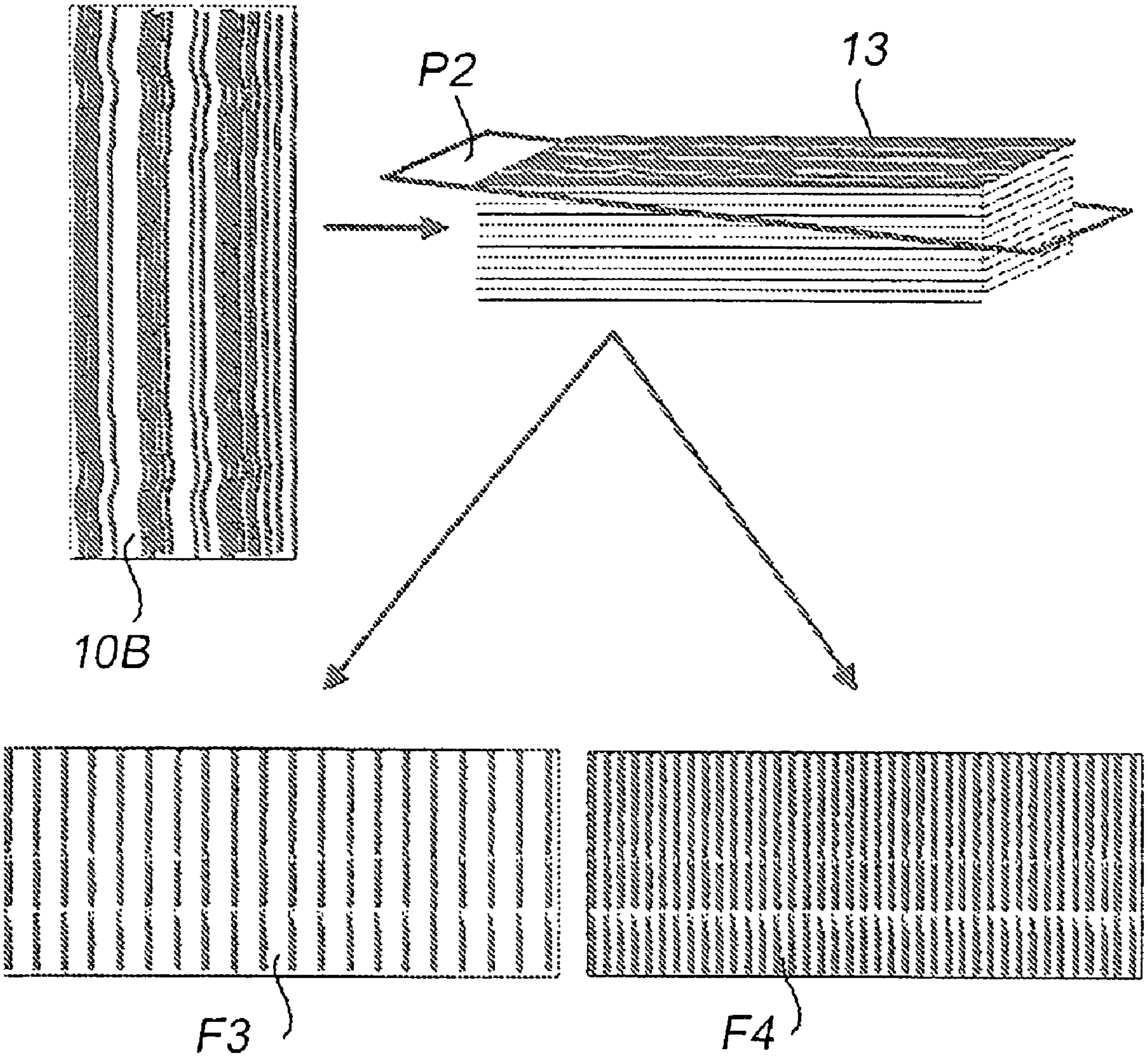
FIG. 11 shows a further diagram illustrating the steps of forming and slicing a flitch of wood according to the invention.

Likewise, as shown in the subsequent diagram of FIG. 11, it is possible to obtain dotted patterns by printing the natural wood sheets 10B with longitudinal striped type patterns, and then slicing the flitch 13 on a slanted plane P2 compared to the longitudinal direction of the flitch 13, instead of in the transversal direction of the preceding example; in this way, the stripes of pattern on the multi-laminar sheet, or the dots, will be parallel and oriented in the transversal direction to the sheets F3 and F4.

Whenever natural wood sheet 10C with bands or stripes of pattern printed in an oblique direction are used, multi-laminar sheets with figurations intermediate to those indicated above will be obtained; this solution can be useful whenever it is desired to obtain a simulation of the radial growth rings of the wood.

The last case concerns FIGS. 8 and 9 of the accompanying drawings, where the figurations printed on the natural wood sheets 10E are patches 23 having a generally irregular, or geometrical outline, which in general terms can constitute an evolution of the simple striped and/or banded patterns of the previous cases; however, it is possible not only to simulate simple "patchy" patterns, but actual figures.

In this case it is possible to obtain a relevant number of possible appearances of the pattern printed on the natural wood sheets, and a consequent infinity number of figurations on the multi-laminar sheets.

As mentioned previously, different printing systems can be used for marking the basic pattern on the natural wood sheets; in FIG. 3 a roller-type printing system has been indicated; contemporaneously to the roller system, other alternatives have been tested and have proved to be just as effective, such as silk-screen printing by means of a planar screen or a roller, and ink jet printing.

The various systems have made it possible to control, in a similar way, the printing of the basic pattern on the natural wood sheet used for the flitch composition from which the multi-laminar sheets are subsequently sliced.

It was also mentioned that there are different process variables or parameters which can lead to different results, both as regards the penetration and spreading of the colouring agent into the natural wood sheets, and as regards the final figuration of the multi-layered wood thus obtained.

Consequently, it is necessary to be able to vary and control the different process parameters in order to achieve reproducibility and constancy in the results.

For example, it is extremely important to control the temperature of the water or of the solvent in which the colouring agent is dissolved or dispersed, during the step of printing the natural wood sheets; just as important is the chemistry of the colouring agents, especially the pH value, in that it can affect the degree of penetration and diffusion of the colouring agent into the wood.

The dosage or quantity of colouring agent deposited during the printing of the basic pattern on the natural wood sheets is also important; even the moisture content of the wood, as mentioned previously, can affect the result.

Generally speaking, it can be considered that, by using acid class colouring agents, with a neutral or slightly alkaline pH and keeping the temperature of the water of the printing solution at a constant value comprised between 50 and 90° C., it is possible to achieve satisfactory penetration into the wood; in this case it is advisable to maintain the moisture content of the wood comprised between 10% and 30%.

Conversely, whenever a more limited penetration of the colouring agent into the wood is required, it is advisable to use a colouring agent based on pigments, working at a temperature comprised between 30 and 50° C., in a neutral environment, or with a direct colouring agent, also with an acid pH and a temperature comprised between 40 and 50° C. and with sheets having a moisture content comprised between 3% and 8%.

It was mentioned previously that, to prepare a multi-laminar sheet with a well-defined pattern, according to the method of the present invention, the natural wood sheets are prepared by bleaching and then dyeing them to give them a desired background colour, and subsequently going on to the step of printing the basic pattern on one or both sides of the natural wood sheets, repeating it if necessary once or more times to obtain polychromatic effects, and then on to the steps of preparing the flitch and slicing the multi-laminar sheets, which can be followed, whenever required, by further manufacturing for forming a second flitch and additional slicing.

The results which can be achieved are numerous and depend upon the process method followed. Purely by way of explanation, and to complete the present specification, a few practical examples are given here with reference to FIGS. 12, 13 and 14 of the accompanying drawings.

FIRST EXAMPLE

Rotary-cut obeche wood sheets are dyed in a water bath at 100° C., with acid pH, with acid class colouring agents, for example the following "acid orange 3", "acid red 88" and "acid blue 40", until obtaining an even colour in thickness, with tones similar to that of steamed beech.

The sheets in question are then dried to a moisture content of 16%–18%, and subsequently subjected to a printing step with a rubber roller carved with oblique lines, using a mixture of colouring agents of the same class, but with a more intense tonality, with a neutral pH, at a temperature of 80° C.

The sheets thus printed, dehydrated to a moisture content of 4%, were then glued to form a flitch inside a mould having slightly curved surfaces.

The flitch thus obtain was sliced on a plane having a direction slanted by 13° compared to the pattern printing plane.

Figure 12:
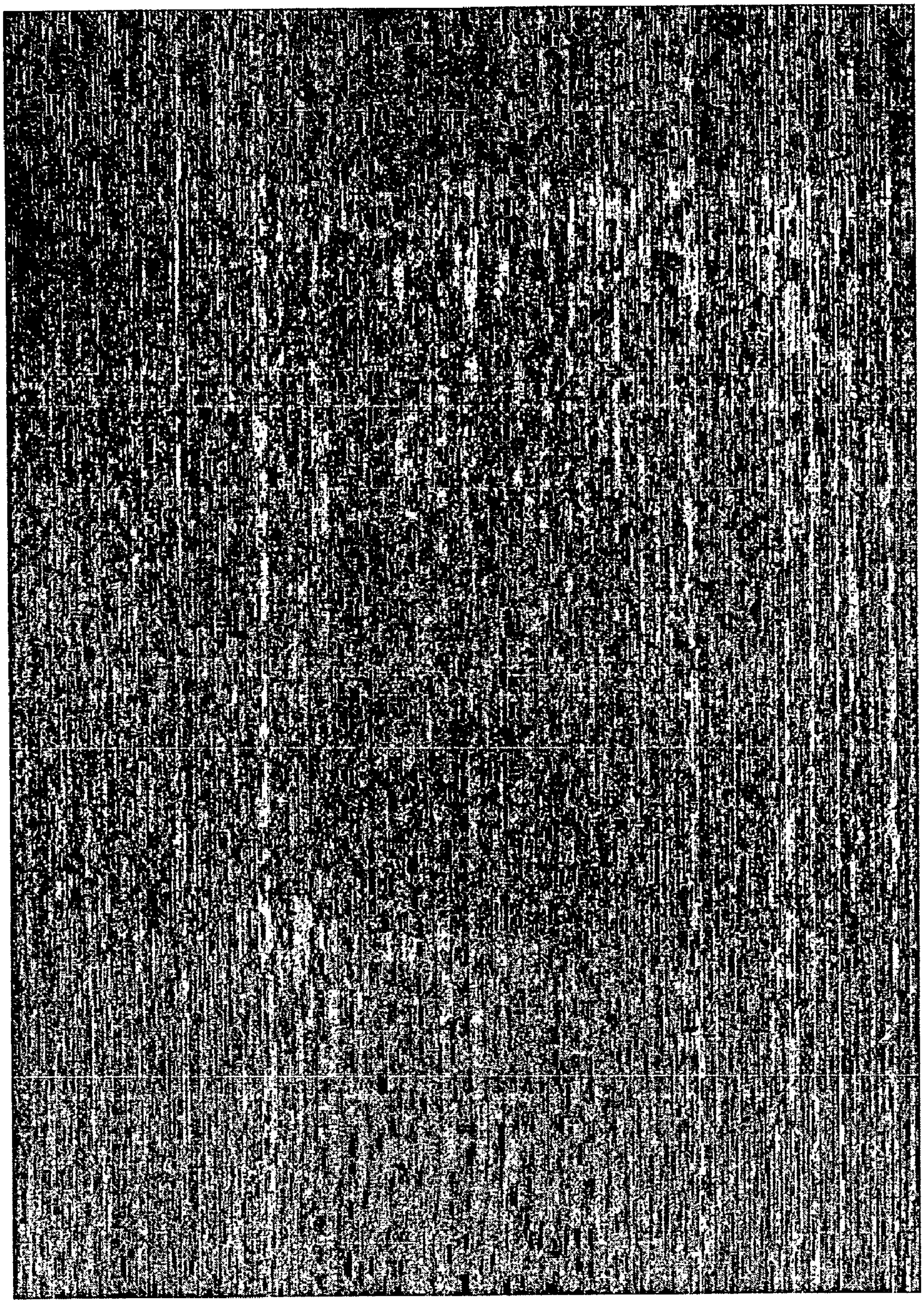
FIGS. 12, 13 and 14 show photographic pictures of multi-laminar wood sheets obtained by means of the method according to the invention.

Multi-laminar sheets simulating the European lancewood, represented in the photograph of FIG. 12, were thus obtained.

SECOND EXAMPLE

Natural poplar sheet are bleached with hydrogen peroxide, washed and dyed in a water bath at 95° C., with an acid pH, with acid class colouring agents, chosen for example from among the following "acid yellow 25", "acid red 62" and "acid blue 40", until obtaining an even colour in the thickness of each sheet, similar to that of sycamore.

The sheets in question are then dried to a moisture content of 16%–21% and marked by printing with a rubber roller carved with longitudinal lines, using a mixture of colouring agents of the same class, but in a more intense shade, with a neutral pH, at a temperature of 70° C.

The sheets thus printed, dried to a moisture content of 4%, were glued together; after the glue hardening, the flitch thus formed was sliced parallel to the gluing plane; the sheets obtained were re-dried, mixed and re-glued, to form a second flitch in a mould with a wavy shape, from which the final multi-laminar sheets were sliced according to a specific cutting plane.

Figure 13:
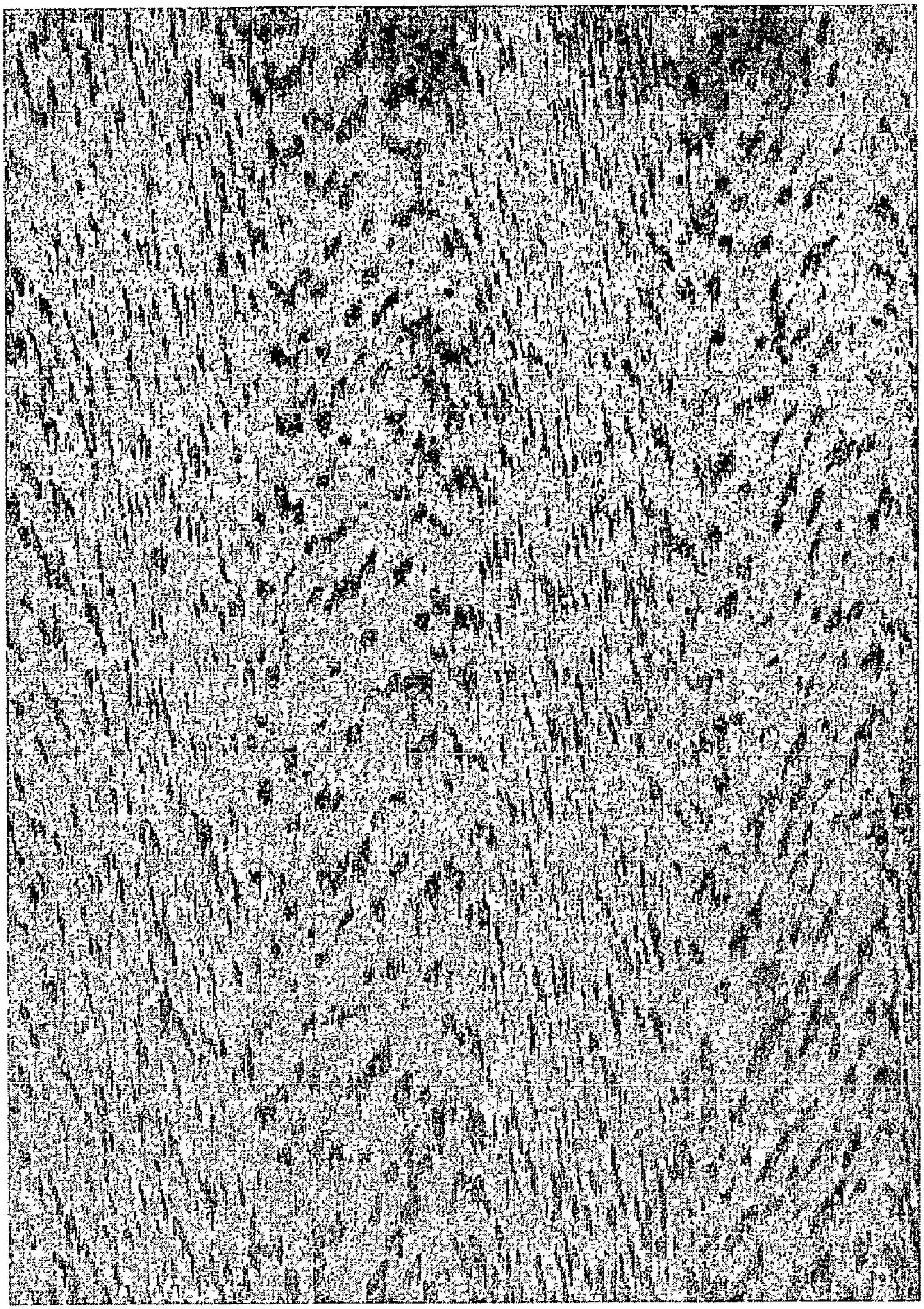

In this way it was possible to obtain multi-laminar sheets simulating "snake wood", having an appearance similar to that of the photograph shown in FIG. 13.

THIRD EXAMPLE

Natural poplar sheets are bleached with hydrogen peroxide, washed and dyed in a water bath at 98° C., with an acid pH, with acid and direct class colouring agent, chosen for example from among the following "acid red 6", "acid blue 25" and "direct yellow 4", until obtaining an even colour in the thickness of the sheets.

The sheets in question are then dried to a relative humidity 16%–21% and marked by printing with a rubber roller carved with circumferential lines, so as to obtain a longitudinal striped or banded pattern on each sheet, using a mixture of colouring agents of the same class, but in a more intense shade, with a neutral pH, at a temperature of 65° C.

The sheets thus printed and dried to a moisture content of 4%, are glued on parallel planes to form a flitch which, after the glue has hardened, is sliced parallel to the gluing plane and resulting sheets dried, mixed together and then are re-glued to form a new flitch in a mould provided with a fine wavy shape, sliced on a specific cutting plane.

Figure 14:
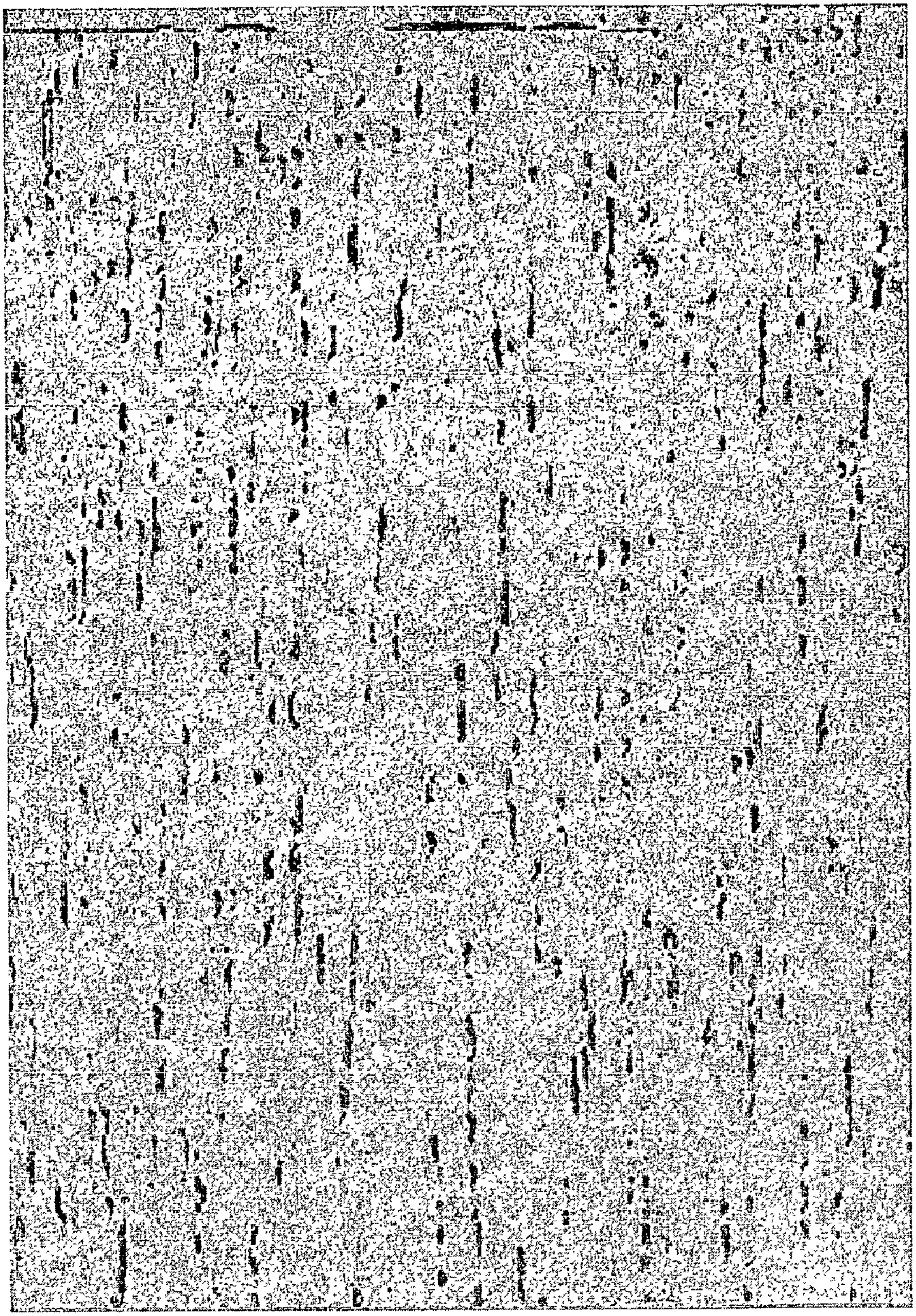

The multi-laminar sheets obtained have an appearance similar to that of Karelian Birch Burl, as shown in the photograph of FIG. 14.

Good results were also achieved by maintaining the natural wood sheets at a constant moisture value comprised between 10 and 30%, making use of a printing solution with direct colours, with an alkaline pH and with the temperature of the solution comprised between 70–80° C.

From what has been described and shown in the accompanying drawings, it will be clear that what is provided is a new method for manufacturing multi-laminar wood sheets, according to which particular use is made of printed patterns on the natural wood sheets used for forming a flitch from which the final product is sliced, while maintaining constant and constantly controllable process conditions in order to obtain repeatable and industrially appreciable results.

It is understood however that what has been described and shown by way of example with reference to the accompanying drawings may undergo other modifications or variations without deviating from the object of the accompanying claims.

I claim:

1. Method for manufacturing multi-laminar patterned wood sheets having patterns of defined shapes and dispositions on their side faces, in which said patterned wood sheets are cut from a multi-layered flitch of superimposed and glued base wood sheets, comprising the steps of:

printing a basic pattern on a side surface of the base wood sheets using a printing solution comprising a colouring agent;

controlling a depth of penetration and a spread of diffusion of the colouring agent into the base wood sheets during said printing step by maintaining the temperature of a printing bath containing the printing solution, drying the wood to a specific moisture content and using a printing solution having a pH value;

composing the flitch comprising said printed wood sheet; and slicing laminar wood sheets from said flitch, wherein increasing the moisture content of the wood increases the spread of diffusion of the coloring agent, wherein increasing the temperature of the printing bath increases the depth of penetration into the wood, and wherein increasing the pH to an alkaline value increases the depth of penetration into the wood, while decreasing the pH value to an acid value decreases the depth of penetration into the wood.

2. Method according to claim 1, wherein said multi-layered flitch comprises natural wood sheets.

3. Method according to claim 1, wherein said multi-layered flitch comprises laminar wood sheets.

4. Method according to claim 1, comprising the step of composing a multi-layered flitch by overlapping natural wood sheets in combination with laminar wood sheets.

5. Method according to claim 1, comprising the step of printing a same basic pattern on at least a part of a face of said base wood sheets.

6. Method according to claim 5, comprising the step of repeating the step of printing a same basic pattern on a same face of a base wood sheet.

7. Method according to claim 6, comprising the step of repeating the step of printing a same basic pattern, in a same colour.

8. Method according to claim 6, comprising the step of repeating the step of printing the same basic pattern in different colours.

9. Method according to claim 1, comprising the step of printing different basic patterns on at least a part of a face of the base wood sheets.

10. Method according to claim 9, comprising the step of repeating the step of printing different basic patterns on at least a same side face of the wood sheets.

11. Method according to claim 10, comprising the step of repeating said printing steps with a same colour.

12. Method according to claim 10, comprising the step of repeating said printing steps with different colours.

13. Method according to claim 1, wherein the coloring agent comprises a soluble colouring substance.

14. Method according to claim 1, wherein the coloring agent comprises a pigment.

15. Method according to claim 13, wherein said colouring substance is selected from the following dyeing classes: acid, direct, basic, reactive.

16. Method according to claim 1, wherein the printing step of the basic pattern is carried out by means of a roller, planar or roller silk screen, or by an inkjet printing system.

17. Method according to claim 1, wherein said printing bath comprises a surfactant.

18. Method according to claim 1, comprising the step of composing the flitch by means of base wood sheets printed with a same basic pattern of the same colour.

19. Method according to claim 1, comprising the step of composing the flitch by means of base wood sheets printed with a same basic pattern, of different colours.

20. Method according to claim 1, comprising the step of composing the flitch by means of base wood sheets printed with different basic patterns, of a same colour.

21. Method according to claim 1, comprising the step of composing the flitch by means of base wood sheets printed with different basic patterns, of different colours.

22. Method according to claim 1, comprising the step of printing a basic pattern comprising coloured bands and/or stripes which extend in one direction on the wood sheet.

23. Method according to claim 22, wherein the coloured bands and/or stripes of the printed pattern extend parallel to the wood fibres direction.

24. Method according to claim 22, wherein the coloured bands and/or stripes of the printed pattern are transversally extending to the wood fibres direction.

25. Method according to claim 22, wherein the coloured bands and/or stripes of the printed pattern are extending at an angle in respect to the wood fibres direction.

26. Method according to claim 1, wherein the basic pattern comprises a patch pattern.

27. Method according to claim 1, comprising the step of varying the pattern of the multi-laminar wood sheets, by changing the slicing angle of said flitch.

28. Method according to claim 1, wherein the printing step of the basic pattern is carried out while maintaining the moisture content of the wood sheets, at a value comprised between 5 and 30%, with the printing bath temperature comprised between 40 and 90° C.

29. Method according to claim 28, wherein the moisture content of the wood sheets, is maintained at a constant value comprised between 10 and 30%, with the printing bath temperature at a value comprised between 50 and 90° C., for acid colouring agents, and with a neutral or slightly alkaline pH value.

30. Method according to claim 28, wherein the moisture content of the wood sheets is maintained at a constant value comprised between 5 and 15%, making use of the printing bath comprising coloured pigments, at a temperature between 20 and 50° C.

31. Method according to claim 28, wherein the moisture content of the wood sheets is maintained at a constant value comprised between 5 and 15%, making use of the printing bath of direct colouring agents, with an acid pH value, and with a bath temperature comprised between 50 and 60° C.

32. Method according to claim 28, wherein the moisture content of the wood sheets is maintained at a constant value between 10 and 30%, making use of the printing solution comprising direct colouring agents, with an alkaline pH and with the temperature of the solution between 70 and 80° C.

33. A method for manufacturing multi-laminar patterned wood sheets having patterns of defined shapes and dispositions on their side faces, in which said patterned wood sheets are cut from a multi-layered flitch of superimposed and glued base wood sheets, comprising the steps of:

printing a basic pattern on a side surface of the base wood sheets using a printing solution comprising a coloring agent;

controlling a depth of penetration and a spread of diffusion of the coloring agent into the base wood sheets during said printing step by maintaining at least one of the temperature of a printing bath containing the coloring agent between 20° C. and 90° C., a moisture content of the wood sheets between 5% and 30%, and by using a printing solution having an alkaline pH value;

composing the flitch comprising said printed wood sheets; and slicing laminar wood sheets from said flitch.

34. A method for manufacturing multi-laminar patterned wood sheets having patterns of defined shapes and dispositions on their side faces, in which said patterned wood sheets are cut from a multi-layered flitch of superimposed and glued base wood sheets, comprising the steps of:

printing a basic pattern on a side surface of the base wood sheets using a printing solution comprising a coloring agent;

controlling a depth of penetration and a spread of diffusion of the coloring agent into the base wood sheets during said printing step by maintaining at least one of the temperature of a printing bath containing the coloring agent between 20° C. and 90° C., drying the wood to a moisture content between 5% and 30% and using a printing solution having an acid pH value;

composing the flitch comprising said printed wood sheets; and slicing laminar wood sheets from said flitch.

35. The method according to claim 1, and increasing the moisture content of the wood within the range comprised between 5% and 30% increases the spread of diffusion of the coloring agent.

36. The method according to claim 35, wherein increasing the temperature of the printing bath within the range comprised between 20° C. and 90° C., increases the depth of penetration into the wood.

* * * * *